No. 892,123. PATENTED JUNE 30, 1908.
J. H. BLEOO.
FLUID PRESSURE BRAKE MECHANISM.
APPLICATION FILED MAR. 5, 1908.
2 SHEETS—SHEET 1.
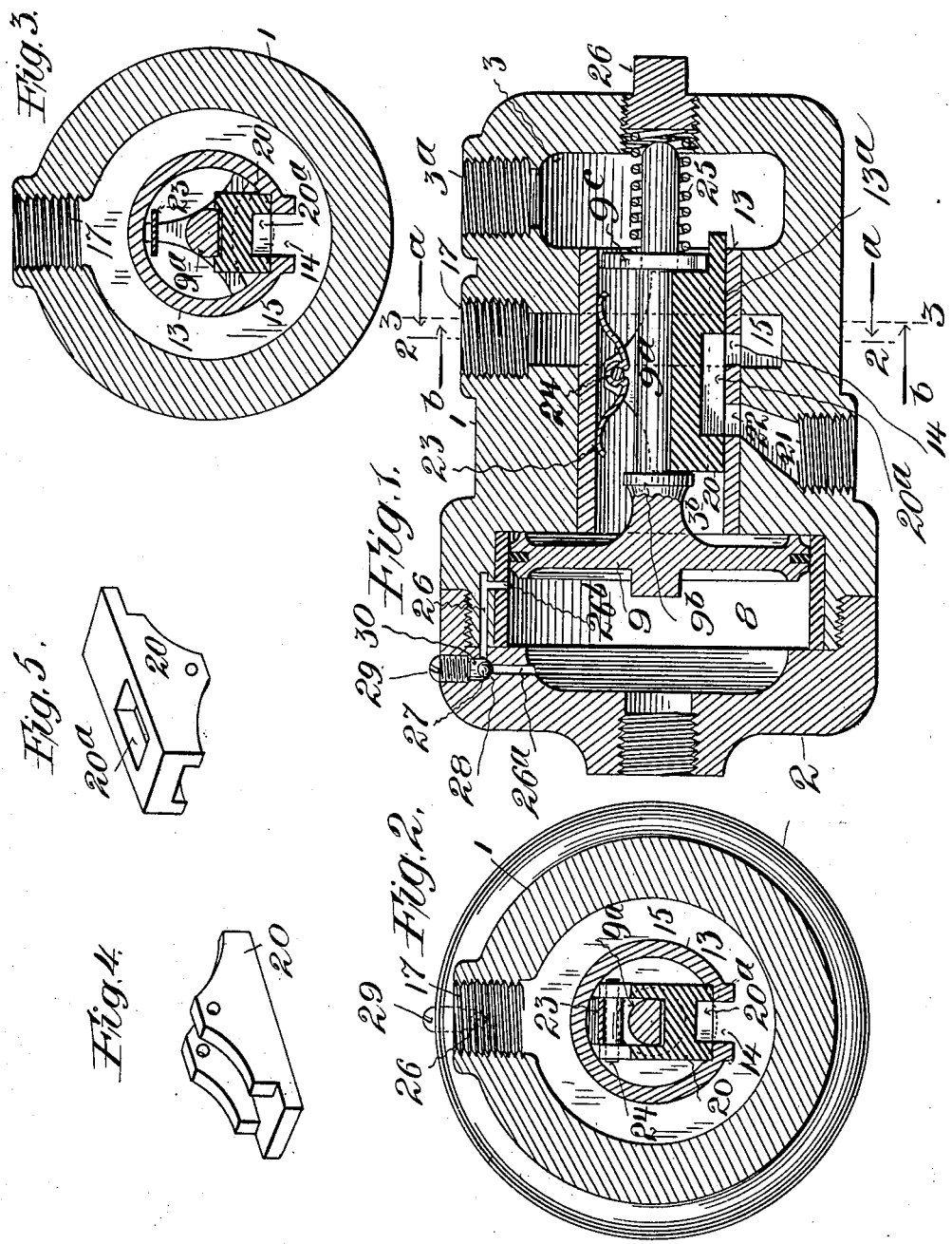
Witnesses:
Inventor
John H Bleoo.
By his Attorney
T. P. Bourne

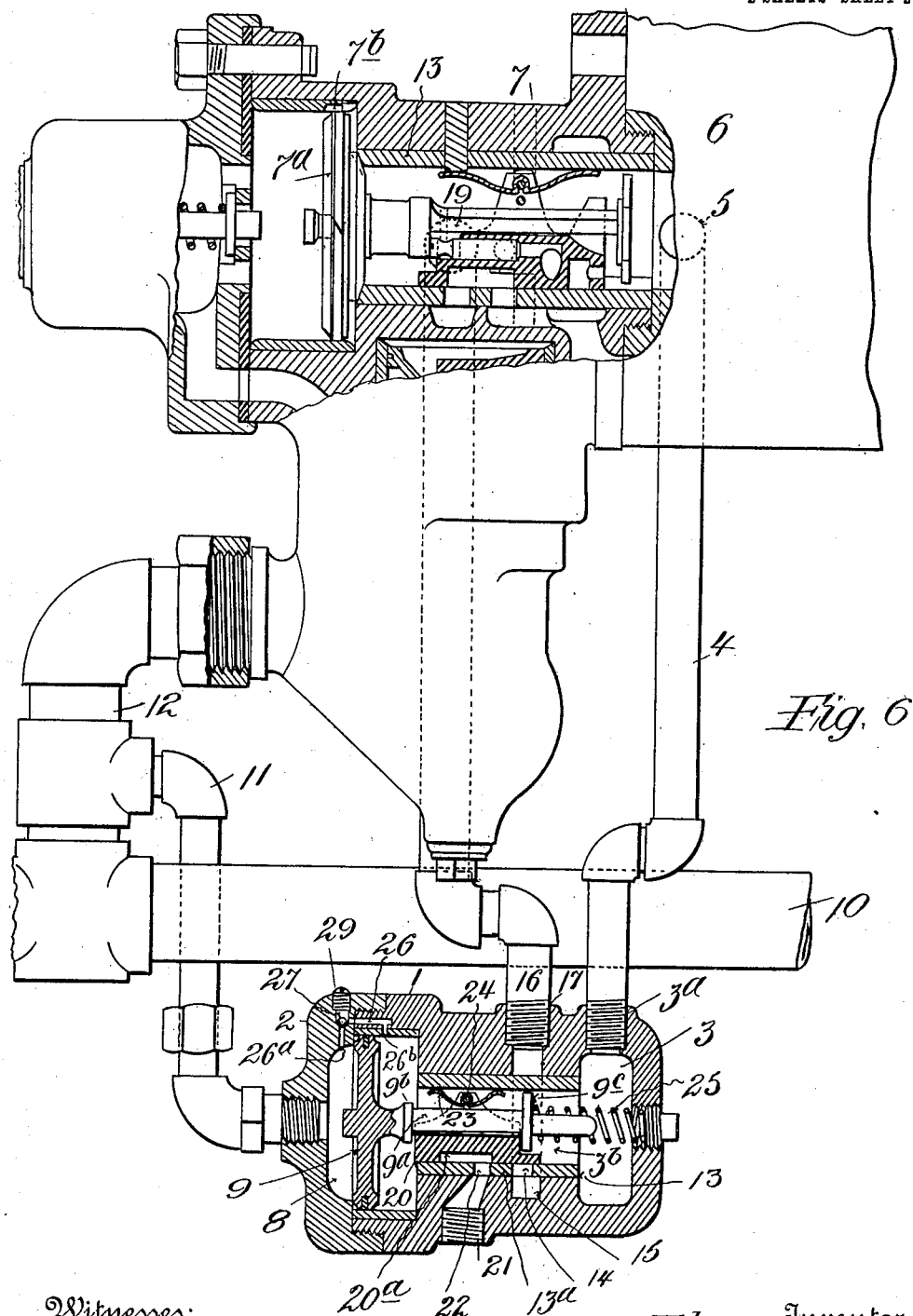

UNITED STATES PATENT OFFICE.

JOHN H. BLEOO, OF BROOKLYN, NEW YORK, ASSIGNOR TO ABRAHAM B. LEVY, OF NEW YORK, N. Y.

FLUID-PRESSURE BRAKE MECHANISM.

No. 892,123.  Specification of Letters Patent.  Patented June 30, 1908.

Application filed March 5, 1908. Serial No. 419,317.

*To all whom it may concern:*

Be it known that I, JOHN H. BLEOO, a citizen of the United States, and resident of Canarsie, borough of Brooklyn, in the county of Kings and State of New York, have invented certain new and useful Improvements in Fluid-Pressure Brake Mechanism, of which the following is a specification.

My invention has for its object to permit a fluid pressure or air brake system to be recharged while the brakes are set or applied without regard to the positions that the slide valves and pistons of the triple valves may be in at such time, and to prevent undue recharging of auxiliary reservoirs when the brakes are off and the triple valves are in full release position. To this end I provide a recharging brake holding valve device having chambers and passages in connection with the corresponding auxiliary reservoir, the brake cylinder exhaust of the triple valve, and the train line of an air brake system, such as the Westinghouse and New York systems, which valve device is provided with a valve controlled by a piston actuated by preponderating air pressure from the corresponding auxiliary reservoir upon reduction of train line pressure to close the brake cylinder exhaust to atmosphere, and with means to permit recharging of the corresponding auxiliary reservoir through such device when its piston has been moved by preponderating auxiliary air pressure to cause closing of the brake cylinder exhaust to atmosphere, and to prevent such recharging through the device when its valve has opened the brake cylinder exhaust to atmosphere. In the form of my invention illustrated in the accompanying drawings the recharging ports and passages thereof are so located with respect to the position of the corresponding piston that when the latter is in the full release position there will be no passage from the train line to the corresponding auxiliary reservoir through the device, and yet when the piston of such device has been moved to service it will permit the recharging ports and passages to communicate with the chamber thereof that is in connection with the corresponding auxiliary reservoir, a valve being provided in such passage to prevent reduction therethrough of auxiliary air pressure to the train line while the piston of the recharging device is in service position.

My present improvements as illustrated are similar in many respects to the recharging device shown in my application for Letters Patent filed June 13, 1907, Serial No. 378,686, wherein the recharging passage is shown formed in the piston and provides communication at all times from the train line to the corresponding auxiliary reservoir, and is not controlled by the piston thereof, so that recharging air may pass to the corresponding auxiliary reservoir in all positions of the piston, as distinguished from my present improvements wherein the recharging air may flow through the device to the corresponding auxiliary reservoir only when the piston is moved to cause the corresponding slide valve to close the brake cylinder exhaust to atmosphere. But, if the triple valve slide valve has moved to full release position while the slide valve of my recharging device remains in position to close the brake cylinder exhaust to atmosphere recharging of the corresponding auxiliary reservoir may occur simultaneously through the leakage groove of the triple valve and the recharging passage of my recharging device.

Reference is to be had to the accompanying drawings forming part hereof, wherein, Figure 1 is a central section of my improved recharging valve device shown in "full release" position; Fig. 2 is a cross section, substantially on the line 2, 2, in Fig. 1, looking in the direction of the arrows *a, a,* Fig. 3 is a cross section substantially on the line 3, 3, in Fig. 1, looking in the direction of the arrows *b, b,* Fig. 4 is a perspective view of the slide valve, Fig. 5 is an inverted view thereof, and Fig. 6 is a side elevation, partly in section, illustrating the triple valve and my improved recharging valve device in connection therewith, the triple valve slide valve being shown in full release position and the slide valve and piston of my improved recharging valve device being shown in "service" position.

Similar numerals of reference indicate corresponding parts in the several views.

My improved recharging valve device which is adapted to hold the corresponding brakes applied during recharging of the auxiliary reservoir while the slide valve of the corresponding triple valve at such time may be in any position, is arranged as follows: A suitable casing 1 having a cap 2 (which may be held on the casing by screw threads) is provided with a chamber or space 3 that is in communication with auxiliary air, as by a pipe 4 connected with inlet 3ª and shown connected at 5 with the auxiliary air space of the brake cylinder head 6 to which the triple valve 7 is attached in well known manner, although such chamber 3 may be connected with auxiliary air in any other suitable manner. Casing 1 also has a chamber 8 containing a suitable piston 9, which chamber is connected with train pipe 10 in any suitable manner, as by a pipe 11, the triple valve also being connected with train pipe 10 as by connections 12 in well known manner. The stem 9ª of piston 9 passes within an extension 3ᵇ of chamber 3 in casing 1, shown formed within sleeve 13 within said casing. Said chamber 3ᵇ or its sleeve 13 has a suitable valve seat 13ª communicating by a port 14 with a suitable passage 15 in casing 1, which passage communicates, as by pipe 16 (connected with inlet 17), with the brake cylinder exhaust port 19 of triple valve 7. Port 14 is controlled by a valve 20, shown in the form of a slide valve, mounted upon seat 13ª and provided on its under surface with a cavity 20ª to communicate with port 14 and with an exhaust passage 21 in casing 1, as through a port 22 in sleeve 13, for placing the brake cylinder exhaust in communication with the atmosphere in the position of the parts shown in Fig. 1, which is the full release position of my improved valve with the brakes released. Slide valve 20 is shown arranged to be operated by piston 9 by means of the shoulders 9ᵇ, 9ᶜ of stem 9ª. A spring 23 connected with slide valve 20, as by a pin 24, and bearing against sleeve 13 serves to maintain valve 20 upon its seat. At 25 I have shown a relatively light spring coiled around stem 9ª and bearing against shoulder 9ᶜ and against an adjustable stop or plug 26 screwed into a hole in casing 1 whereby the tension of said spring may be regulated. The purpose of spring 25 is to assist in moving piston 9 and valve 20 to the left in Fig. 1 upon a service or emergency application or reduction of air pressure, but said spring is not intended to be of such strength as to overcome the air load on valve 20 and the friction of the moving parts, and yet said spring will tend to resist the return movement of piston 9 and valve 20 during recharging, while permitting ready movement of said parts upon sudden increase of pressure in the train line, as during full release pressure in the system. Upon service application or reduction of train pipe pressure, auxiliary air pressure will cause piston 9 and valve 20 to move to the left (as to the position shown in Fig. 6), owing to the preponderating auxiliary air pressure in chambers 3, 3ᵇ, above train line pressure in chamber 8, to cause slide valve 20 to lap port 14 and prevent the escape of brake cylinder air to atmosphere, while the brakes are applied and during recharging of the system, valve 20 remaining in such position until full release pressure, or a sudden pressure higher than recharging pressure, is in the system.

The parts above described are substantially similar to the brake holding recharging valve device shown in my application, Serial No. 378,686, aforesaid, except that in my said application the recharging passage is shown provided in the piston of the recharging valve device, and so arranged as to permit recharging air to pass through such passage to the corresponding auxiliary reservoir at all times. In my present improvement the passage for the recharging air in my valve device does not permit recharging air to pass therethrough to the auxiliary reservoir when the brake holding slide valve 20 is in the full release position shown in Fig. 1, but only permits such recharging air to pass during the time that the brake cylinder exhaust to atmosphere is closed by the slide valve 20, in position substantially as shown in Fig. 6. To this end I have shown a passage 26 formed partly in casing 1 and partly in cap 2, whose port 26ª is open at all times to train line air in chamber 8, but whose port 26ᵇ is in such position with respect to piston 9 as not to communicate with chamber 3, 3ᵇ, when said piston is in full release position, as shown in Fig. 1, but when said piston has been moved to service position by preponderating auxiliary air pressure from the corresponding auxiliary reservoir, as in Fig. 6, piston 9 will move beyond port 26ᵇ and thereby recharging air may pass through passage 26 to the auxiliary reservoir through chamber 3, 3ᵇ. To prevent reduction of auxiliary air pressure through passage 26 when piston 9 is in the position shown in Fig. 6 I provide a valve 27, shown in the form of a ball valve, adapted to fit against a seat 28 in passage 26 to prevent the flow of air through said passage toward the left in Fig. 1 and to permit the flow of air through said passage at all times toward the right in Fig. 1. Said valve is shown retained at its seat 28 by means of plug 29 screwed in cavity 30 over valve 27.

My improvements are designed to be used in connection with the usual and necessary equipment of a fluid pressure or air brake system having the usual engineer's or controlling valve provided with a reducing valve, and which may also be provided with an extra reducing valve in any suitable or well known manner to supply the train line with recharging air at a pressure below that usually supplied in the "running" position, and which may be arranged substantially as shown in my said application, Serial No. 378,686. With one of my improved recharging brake holding valves connected with each of the triple valves of a train in the manner set forth, a reduction of train pipe pressure, when the controlling valve handle is moved to service position, will cause the triple valve pistons and slide valves to move to service position to apply the brakes in usual manner, and thereupon the reduction of pressure in chambers 8 of my improved brake holding valve devices to the train line will, by reason of the preponderating air pressure in chambers 3, $3^b$, from the corresponding auxiliary reservoirs, cause pistons 9 and slide valves 20 to move from the normal full release position in Fig. 1 to the brake holding position in Fig. 6, whereby pistons 9 will pass beyond ports $26^b$ and slide valves 20 will close ports 14 while at the same time the slide valves of the triple valves will close the brake cylinder exhaust to atmosphere in usual manner, and the controlling valve may then be moved to "lap" position as usual, and the brakes be held. Passages 26 will now place chambers 8 and the train line of each brake holding device in communication with the corresponding auxiliary reservoir through chambers 3, $3^b$, and when the controlling valve handle is next moved to the recharging position, recharging air will flow through passage 26 of each recharging device to the corresponding auxiliary reservoir. Such increased recharging air pressure in the train line by acting upon pistons $7^a$ of the triple valves may cause more or less of them to move to full release position, and thereupon recharging air may further flow to the corresponding auxiliary reservoir through the usual leakage groove $7^b$ of the triple valve as well as continuing to flow to the auxiliary reservoir through passage 26. Such increased recharging air pressure, however, will not cause pistons 9 and slide valves 20 to move from the service position shown in Fig. 6, but such pistons and slide valves will remain in such brake holding position for the reason that the increased recharging air in the system passes through passages 26 to the auxiliary reservoirs maintaining a substantial equilibrium of pressure upon opposite sides of pistons 9 during recharging, and also by reason of the air load on valves 20, the friction of the parts, and the light resistance of springs 25. Upon sudden increase of train pipe pressure, such as when the controlling valve is next moved to full release position, the pistons 9 by reason of the increased train line pressure will be moved toward full release position and after a short movement said pistons will close the ports $26^b$ and thereby quickly shut off further flow of air to the auxiliary reservoirs through passages 26, so that the increased flow of air in the train line may quickly pass on from valve to valve without material diminution through passages 26, so that by thus enabling passages 26 to be closed by pistons 9, even before the latter have resumed their normal full release positions, the auxiliary reservoirs will not take excess air from the train pipe beyond that which would usually occur through leakage grooves $7^b$ of the triple valves when their pistons arrive at the full release positions during the full release application. By means of my improvements, therefore, the triple valve pistons and slide valves, during recharging of the system, may assume any position without danger of releasing the brakes, as the valves 20 will shut off the brake cylinder exhaust to atmosphere during recharging of the system, and the early closing of ports $26^b$ by pistons 9 upon full release pressure being thrown into the system further aids all triple valves passing to full release position that may not have passed to such position during recharging of the system. Furthermore, by means of my improvements the recharging air supplied to the system (which air may be supplied by any well known controlling or engineer's valve provided with recharging means, or in the manner shown in my application, Serial No. 378,686, before mentioned) while the brakes are held applied by valves 20, enables air leaks in the system to be kept from reducing train line pressure to prevent "leaking on" of the brakes, and the auxiliary reservoirs may be kept supplied with sufficient air to permit further application of the brakes if desired by maintaining the auxiliary reservoirs with a pressure above the brake cylinder pressure while the brakes are applied. In the "running" position the pistons 9 and valves 20 will be in full release position during the usual supply of the train line while the triple valve slide valves are in full release position.

A brake system equipped with my improvements may be operated in the usual manner at all times, as such operation is not affected in any manner by the inclusion in the system of my improvements, yet my improvements provide improved means to permit recharging of a brake system without regard to the parts of the triple valves and without danger of releasing the brakes during recharging in any position of the triple valve parts.

Having now described my invention what I claim is:

1. In a fluid pressure brake mechanism, the combination of a triple valve, a brake cylinder, and a train pipe, with a brake holding valve device communicating with the train pipe, the auxiliary reservoir, and the brake cylinder exhaust, and having no communication through it between the train pipe and the corresponding auxiliary reservoir while its parts are in full release position, and provided with means operative by preponderating auxiliary air pressure to close the brake cylinder exhaust upon reduction of train pipe pressure and having means to thereupon place the train pipe in communication through the device with the corresponding auxiliary reservoir, said parts being arranged to open said brake cylinder exhaust and close communication between the train pipe and auxiliary reservoir upon a sudden increase of train pipe pressure.

2. In a fluid pressure brake mechanism, the combination of a triple valve, a brake cylinder, and a train pipe, with a brake holding valve device communicating with the train pipe, the auxiliary reservoir, and the brake cylinder exhaust, and having no communication through it between the train pipe and the corresponding auxiliary reservoir while its parts are in full release position, and provided with means operative by preponderating auxiliary air pressure to close the brake cylinder exhaust upon reduction of train pipe pressure and having means to thereupon place the train pipe in communication through the device with the corresponding auxiliary reservoir, said parts being arranged to open said brake cylinder exhaust and close communication between the train pipe and auxiliary reservoir upon a sudden increase of train pipe pressure, and means to prevent reduction of auxiliary air pressure to the train pipe through said device while the train pipe is in communication with the auxiliary reservoir through the device during the closing of the brake cylinder exhaust to atmosphere.

3. In a fluid pressure brake mechanism, the combination of the necessary operating parts thereof, with a brake holding device communicating with the train pipe, the auxiliary reservoir, and the brake cylinder exhaust, and having a passage normally out of communication between the train pipe and auxiliary reservoir and also provided with means operative by preponderating auxiliary air pressure to close the brake cylinder exhaust to atmosphere and place the train pipe in communication through said passage with the auxiliary reservoir upon reduction of train pipe pressure and to close communication between the train pipe and auxiliary reservoir, and open the brake cylinder exhaust upon a sudden increase of train pressure acting upon said means.

4. In a fluid pressure brake mechanism, the combination of the necessary operating parts thereof, with a brake holding valve device communicating with the train pipe, the auxiliary reservoir, and the brake cylinder exhaust, and provided with a passage normally out of communication between the train pipe and the auxiliary reservoir, and provided with means operative by preponderating auxiliary air pressure to close the brake cylinder exhaust to atmosphere and open communication between the train line and auxiliary reservoir in the direction of the auxiliary reservoir upon reduction of train pipe pressure, and arranged to close communication between the train pipe and auxiliary reservoir and open the brake cylinder exhaust upon a sudden increase of train pipe pressure acting upon said means.

5. In a fluid pressure brake mechanism, the combination of the necessary operating parts thereof, with a brake holding valve device communicating with the train pipe, the auxiliary reservoir, and the brake cylinder exhaust, and provided with a passage normally out of communication between the train pipe and the auxiliary reservoir, and provided with means operative by preponderating auxiliary air pressure to close the brake cylinder exhaust to atmosphere and open communication between the train line and auxiliary reservoir in the direction of the auxiliary reservoir upon reduction of train pipe pressure, and arranged to close communication between the train pipe and auxiliary reservoir and open the brake cylinder exhaust upon a sudden increase of train pipe pressure acting upon said means, and means to prevent reduction of auxiliary air pressure to the train pipe while the latter is in communication with the auxiliary reservoir through said device.

6. In a fluid pressure brake mechanism, the combination of the necessary operating parts thereof, with a recharging valve having a chamber communicating with the train pipe, a chamber communicating with the auxiliary reservoir, and a chamber in communication with the brake cylinder exhaust, and having a passage normally out of communication between the train pipe and the auxiliary reservoir, and also having means to close the brake cylinder exhaust and place said passage in communication with the train pipe and the auxiliary reservoir upon preponderating auxiliary air pressure acting upon said means upon reduction of train pipe pressure, and arrranged to close communication between the train pipe and the auxiliary reservoir and open the brake cylinder exhaust to atmosphere upon a sudden increase of train pipe pressure.

7. In a fluid pressure brake mechanism, the combination of the necessary operating parts thereof, with a brake holding valve device communicating with the train pipe, the auxiliary reservoir and the brake cylinder exhaust, and having a passage normally not in communication with the train pipe and the auxiliary reservoir, and a valve and piston to control the brake cylinder exhaust, said piston being arranged on one side of a port of said passage in full release position, and on the other side of said port when said piston and valve are in service position to cause said passage to communicate with the train pipe and the auxiliary reservoir through said device.

8. In a fluid pressure brake mechanism, the combination of the necessary operating parts thereof, with a recharging brake holding device having a chamber communicating with the train pipe and provided with a passage having two ports in normal communication with said chamber, a piston in said chamber adapted to move across one of said ports, a chamber in communication with auxiliary air and adapted to be placed in communication with the train pipe through said passage by the movement of said piston in one direction and to have such communication shut off by the movement of said piston in another direction, a chamber communicating with the brake cylinder exhaust, and a valve operated by said piston to control the brake cylinder exhaust to atmosphere.

9. In a fluid pressure brake mechanism, the combination of the necessary operating parts thereof, with a recharging brake holding valve device having a chamber communicating with the train pipe and provided with a passage having two ports in normal communication with said chamber, one of said ports being located in a position between opposite sides of said chamber, a piston in said chamber adapted to pass across said port, a chamber communicating with the auxiliary reservoir and adapted to be placed in communication with said passage by the movement of said piston across said port, a chamber communicating with the brake cylinder exhaust and having a port, and a slide valve operated by said piston and provided with means to place the last named port in communication with the atmosphere upon increase of train pipe pressure.

10. In a fluid pressure brake mechanism, the combination of the necessary operating parts thereof, with a recharging brake holding valve device having a chamber communicating with the train pipe and provided with a passage having two ports in normal communication with said chamber, one of said ports being located in a position between opposite sides of said chamber, a piston in said chamber adapted to pass across said port, a chamber communicating with the auxiliary reservoir and adapted to be placed in communication with said passage by the movement of said piston across said port, a chamber communicating with the brake cylinder exhaust and having a port, a slide valve operated by said piston and provided with means to place the last named port in communication with the atmosphere upon increase of train pipe pressure, and means to prevent reduction of auxiliary air through said passage to the train pipe when said piston and valve are in service position.

11. A recharging brake holding valve device comprising a casing having a chamber for communication with auxiliary air, a chamber for communication with a train pipe, a piston in said second named chamber, said casing having a passage provided with two ports communicating with said chamber, one of said ports being in position to be crossed by said piston to place said chambers in communication through said passage, said casing having a chamber for communication with the brake cylinder exhaust and provided with a port, and a valve operated by said piston to control said port.

12. A recharging brake holding valve device comprising a casing having a chamber for communication with auxiliary air, a chamber for communication with a train pipe, a piston in said chamber, said casing having a passage provided with two ports communicating with said chamber, one of said ports being in position to be crossed by said piston to place said chambers in communication through said passage, said casing having a chamber for communication with the brake cylinder exhaust and provided with a port, a valve operated by said piston to control said port, and a valve in said passage to prevent passage of air from the first named chamber to the second named chamber.

13. A brake holding valve device comprising a casing having chambers near opposite ends and a communicating space between them, a piston in one of said chambers normally closing communication between said chambers, said casing having a passage provided with two ports normally communicating with the piston chamber, one of said ports being located between the ends of said chamber in position to be crossed by said piston to place said chambers in communication through said passage in one position of said piston, said casing having a chamber provided with a port opening into said communicating space, and also having an exhaust port, and a valve in said communicating space operated by said piston to control the exhaust through said ports.

14. A brake holding valve device comprising a casing having chambers near opposite ends and a communicating space between them, a piston in one of said chambers normally closing communication between said chambers, said casing having a passage provided with two ports normally communicating with the piston chamber, one of said ports being located between the ends of said chamber in position to be crossed by said piston to place said chambers in communication through said passage in one position of said piston, said casing having a chamber provided with a port opening into said communicating space, and also having an exhaust port, a valve in said communicating space operated by said piston to control the exhaust through said ports, and a valve in said passage to prevent reduction of air from one of said chambers to the piston chamber.

Signed at New York city, in the county of New York, and State of New York, this 25th day of February, A. D. 1908.

JOHN H. BLEOO.

Witnesses:
 MARIE F. WAINRIGHT,
 T. F. BOURNE.